United States Patent
Suzuki et al.

(10) Patent No.: US 11,128,773 B2
(45) Date of Patent: *Sep. 21, 2021

(54) PRINTING APPARATUS, METHOD AND STORAGE MEDIUM FOR CONVEYING SHEETS INTERMITTENTLY TO PRINTHEAD WHILE CONVEYED SHEETS PARTIALLY OVERLAP

(71) Applicant: CANON KABUSHIKI KAISHA, Tokyo (JP)

(72) Inventors: Yoshiaki Suzuki, Nagareyama (JP); Tetsuya Saito, Yokohama (JP); Noriyuki Sugiyama, Kawasaki (JP); Yasuyuki Asai, Tokyo (JP); Motoyuki Taguchi, Komae (JP); Tomofumi Nishida, Yokohama (JP); Syunichi Kunihiro, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,019

(22) Filed: Sep. 18, 2019

(65) Prior Publication Data

US 2020/0014812 A1 Jan. 9, 2020

Related U.S. Application Data

(63) Continuation of application No. 14/623,877, filed on Feb. 17, 2015, now Pat. No. 10,447,875.

(30) Foreign Application Priority Data

Mar. 10, 2014 (JP) .................................. 2014-046762

(51) Int. Cl.
*H04N 1/00* (2006.01)
*B65H 7/02* (2006.01)
(Continued)

(52) U.S. Cl.
CPC ...... *H04N 1/00671* (2013.01); *B41J 11/0095* (2013.01); *B41J 13/0018* (2013.01);
(Continued)

(58) Field of Classification Search
None
See application file for complete search history.

(56) References Cited

U.S. PATENT DOCUMENTS 4,855,790 A 8/1989 Suzuki
5,725,206 A 3/1998 Sugiyama
(Continued)

FOREIGN PATENT DOCUMENTS

CN 1754801 A 4/2006
CN 1833972 A 9/2006
(Continued)

OTHER PUBLICATIONS

European Search Report dated Aug. 3, 2015, issued in European Application No. 15155010.0.
(Continued)

*Primary Examiner* — Haris Sabah
(74) *Attorney, Agent, or Firm* — Venable LLP

(57) ABSTRACT

A printing apparatus includes a first feeding roller, a feeding motor configured to drive the first feeding roller, a second feeding roller, a conveyance roller, a conveyance motor configured to drive the conveyance roller, a printing unit configured to print the printing sheet, a detection sensor configured to detect the leading edge of the printing sheet, and a control unit configured to, when the printing unit performs a printing operation on a preceding sheet, drive the feeding motor in synchronization with the conveyance motor before the detection sensor detects the leading edge of a succeeding sheet, and continuously drive the feeding motor so that the conveying speed of the succeeding sheet by
(Continued)

the feeding motor becomes higher than that of the preceding sheet after the detection sensor detects the leading edge of the succeeding sheet.

28 Claims, 12 Drawing Sheets

(51) Int. Cl.
    *B41J 13/00*     (2006.01)
    *B65H 5/24*     (2006.01)
    *B41J 11/00*     (2006.01)
    *B65H 9/00*     (2006.01)
    *G03G 15/00*     (2006.01)

(52) U.S. Cl.
CPC ............... *B65H 5/24* (2013.01); *B65H 7/02* (2013.01); *B65H 9/004* (2013.01); *H04N 1/0066* (2013.01); *B65H 2511/514* (2013.01); *B65H 2513/10* (2013.01); *G03G 15/607* (2013.01); *G03G 15/6564* (2013.01); *H04N 1/00681* (2013.01)

(56) References Cited

U.S. PATENT DOCUMENTS

| | | | |
|---|---|---|---|
| 5,729,791 | A | 3/1998 | Kutsuwada et al. |
| 5,775,823 | A | 7/1998 | Bekki et al. |
| 5,915,684 | A | 6/1999 | Nakagawa et al. |
| 6,106,114 | A | 8/2000 | Sugiyama |
| 6,113,093 | A | 9/2000 | Morinaga et al. |
| 6,409,043 | B1 | 6/2002 | Fujita et al. |
| 6,454,477 | B1 | 9/2002 | Sugiyama |
| 6,629,795 | B2 | 10/2003 | Kinoshita et al. |
| 6,702,274 | B1 | 3/2004 | Otsuka |
| 6,824,132 | B2 | 11/2004 | Asai et al. |
| 6,848,848 | B2 | 2/2005 | Terao |
| 7,367,732 | B2 | 5/2008 | Koga et al. |
| 8,185,016 | B2 | 5/2012 | Mori et al. |
| 8,387,975 | B2 | 3/2013 | Suzuki |
| 8,439,358 | B2 | 5/2013 | Watanabe et al. |
| 8,459,642 | B2 | 6/2013 | Suzuki |
| 8,556,259 | B2 | 10/2013 | Suzuki |
| 8,720,886 | B2 | 5/2014 | Kuroda et al. |
| 8,740,215 | B2 | 6/2014 | Watanabe et al. |
| 8,783,859 | B2 | 7/2014 | Tokisawa et al. |
| 8,807,556 | B2 | 8/2014 | Sugiyama et al. |
| 8,864,132 | B2 | 10/2014 | Yamagata |
| 8,870,182 | B2 | 10/2014 | Ogata et al. |
| 9,022,378 | B2 | 5/2015 | Kakuta et al. |
| 9,041,958 | B2 | 5/2015 | Kishimoto et al. |
| 9,290,025 | B2 | 3/2016 | Lo et al. |
| 9,388,010 | B2 | 7/2016 | Kunihiro et al. |
| 9,428,355 | B2 | 8/2016 | Asai et al. |
| 9,443,173 | B2 | 9/2016 | Taguchi et al. |
| 9,586,780 | B2 | 3/2017 | Nishida et al. |
| 10,513,407 | B2 | 12/2019 | Nishida et al. |
| 2001/0033050 | A1 | 10/2001 | Kinoshita et al. |
| 2002/0051665 | A1* | 5/2002 | Seto ............... G03G 15/234 399/388 |
| 2004/0051237 | A1 | 3/2004 | Terao |
| 2006/0220297 | A1 | 10/2006 | Kusumi |
| 2007/0019971 | A1* | 1/2007 | Dan ............... G03G 15/6564 399/16 |
| 2007/0048057 | A1 | 3/2007 | Youn et al. |
| 2008/0025782 | A1 | 1/2008 | Koyama et al. |
| 2008/0080920 | A1 | 4/2008 | Yasue et al. |
| 2009/0195589 | A1* | 8/2009 | Itoh ............... B41J 11/003 347/19 |
| 2009/0302530 | A1 | 12/2009 | Darsosumarto et al. |
| 2010/0073449 | A1 | 3/2010 | Yamamoto et al. |
| 2010/0166455 | A1 | 7/2010 | Mori et al. |
| 2011/0309571 | A1* | 12/2011 | Mizuno ............... B41J 13/0009 271/265.01 |
| 2011/0310145 | A1* | 12/2011 | Samoto ............... B41J 11/42 347/9 |
| 2012/0147112 | A1 | 6/2012 | Tanaka et al. |
| 2013/0135409 | A1* | 5/2013 | Ito ............... B65H 5/068 347/104 |
| 2013/0193640 | A1 | 8/2013 | Kobayashi et al. |
| 2014/0064756 | A1 | 3/2014 | Sugiyama et al. |
| 2014/0232055 | A1 | 8/2014 | Yamagata |
| 2014/0239580 | A1 | 8/2014 | Yoshida et al. |
| 2014/0265106 | A1 | 9/2014 | Saitoh et al. |
| 2015/0103112 | A1 | 4/2015 | Lo et al. |
| 2015/0251865 | A1 | 9/2015 | Nishida et al. |
| 2015/0256694 | A1* | 9/2015 | Suzuki ............... B41J 13/0018 358/1.12 |
| 2015/0352865 | A1 | 12/2015 | Taniguchi et al. |
| 2015/0352866 | A1 | 12/2015 | Tanaami et al. |
| 2015/0352870 | A1* | 12/2015 | Imafuku ............... G06F 3/1244 347/5 |
| 2015/0353306 | A1 | 12/2015 | Saito et al. |
| 2015/0353307 | A1 | 12/2015 | Nishida et al. |
| 2015/0353308 | A1 | 12/2015 | Taguchi et al. |
| 2015/0353311 | A1 | 12/2015 | Asai et al. |
| 2015/0355592 | A1 | 12/2015 | Sugiyama et al. |
| 2015/0368055 | A1 | 12/2015 | Kunihiro et al. |
| 2015/0375540 | A1 | 12/2015 | Ogawa et al. |
| 2017/0129726 | A1 | 5/2017 | Nishida et al. |

FOREIGN PATENT DOCUMENTS

| | | |
|---|---|---|
| CN | 1923524 A | 3/2007 |
| CN | 101676106 A | 3/2010 |
| CN | 101770202 A | 7/2010 |
| CN | 103153632 A | 6/2013 |
| CN | 103154832 A | 6/2013 |
| CN | 103176758 A | 6/2013 |
| JP | 06-56299 A | 3/1994 |
| JP | 2000-015881 A | 1/2000 |
| JP | 2000-062975 A | 2/2000 |
| JP | 2002-116590 A | 4/2002 |
| JP | 2002-173234 A | 6/2002 |
| JP | 2002-178581 A | 6/2002 |
| JP | 2003-095461 A | 4/2003 |
| JP | 2004-025605 A | 1/2004 |
| JP | 2007-203546 A | 8/2007 |
| JP | 05-294496 A | 11/2009 |
| JP | 2010-091677 A | 4/2010 |
| JP | 2010-116239 A | 5/2010 |
| JP | 2013-014405 A | 1/2013 |
| JP | 2014-084222 A | 5/2014 |
| JP | 2015-168237 A | 9/2015 |
| JP | 2018-089984 A | 6/2018 |
| WO | 2014/003760 A1 | 1/2014 |

OTHER PUBLICATIONS

Office Action dated Sep. 19, 2016, issued in Chinese Patent Application No. 201510104498.0.
Office Action dated Nov. 30, 2016, issued in Chinese Patent Application No. 201510104450.X.
Office Action dated Oct. 29, 2018, in Chinese Patent Application No. 201710605024.3.
Office Action dated Feb. 12, 2019, in Japanese Patent Application No. 2018-044661.
Office Action dated Mar. 29, 2019, in Chinese Patent Application No. 201810008254.6.
Communication dated Jul. 15, 2019, in European Patent Application No. 15155234.6.

\* cited by examiner

FIG. 2
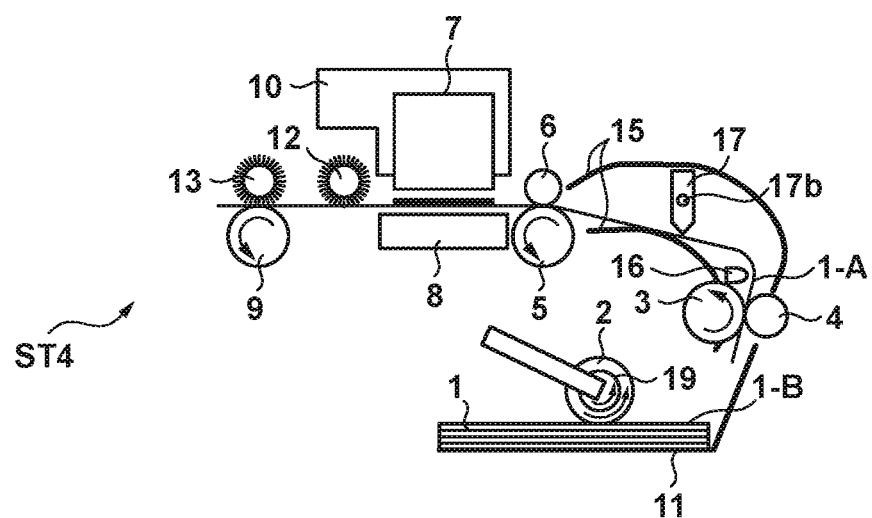
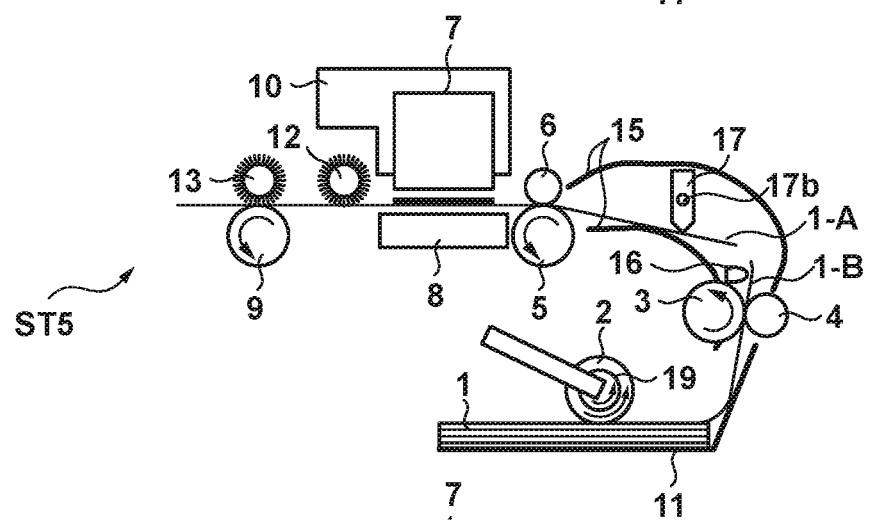
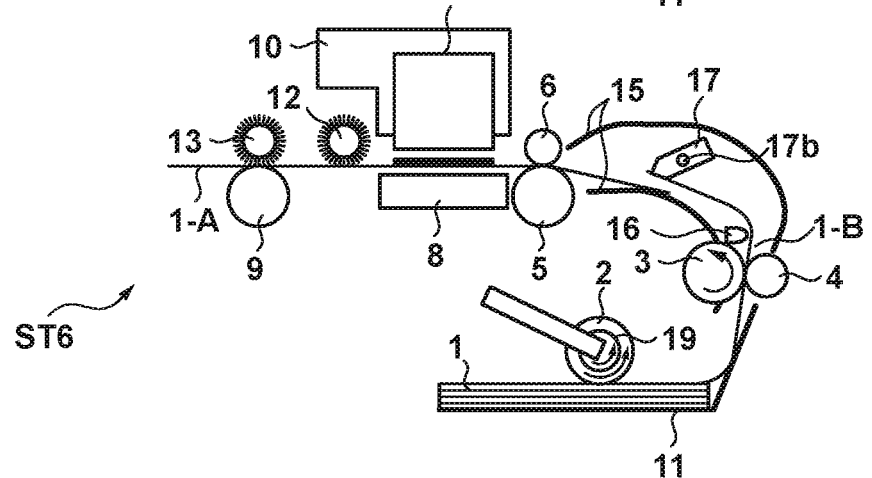

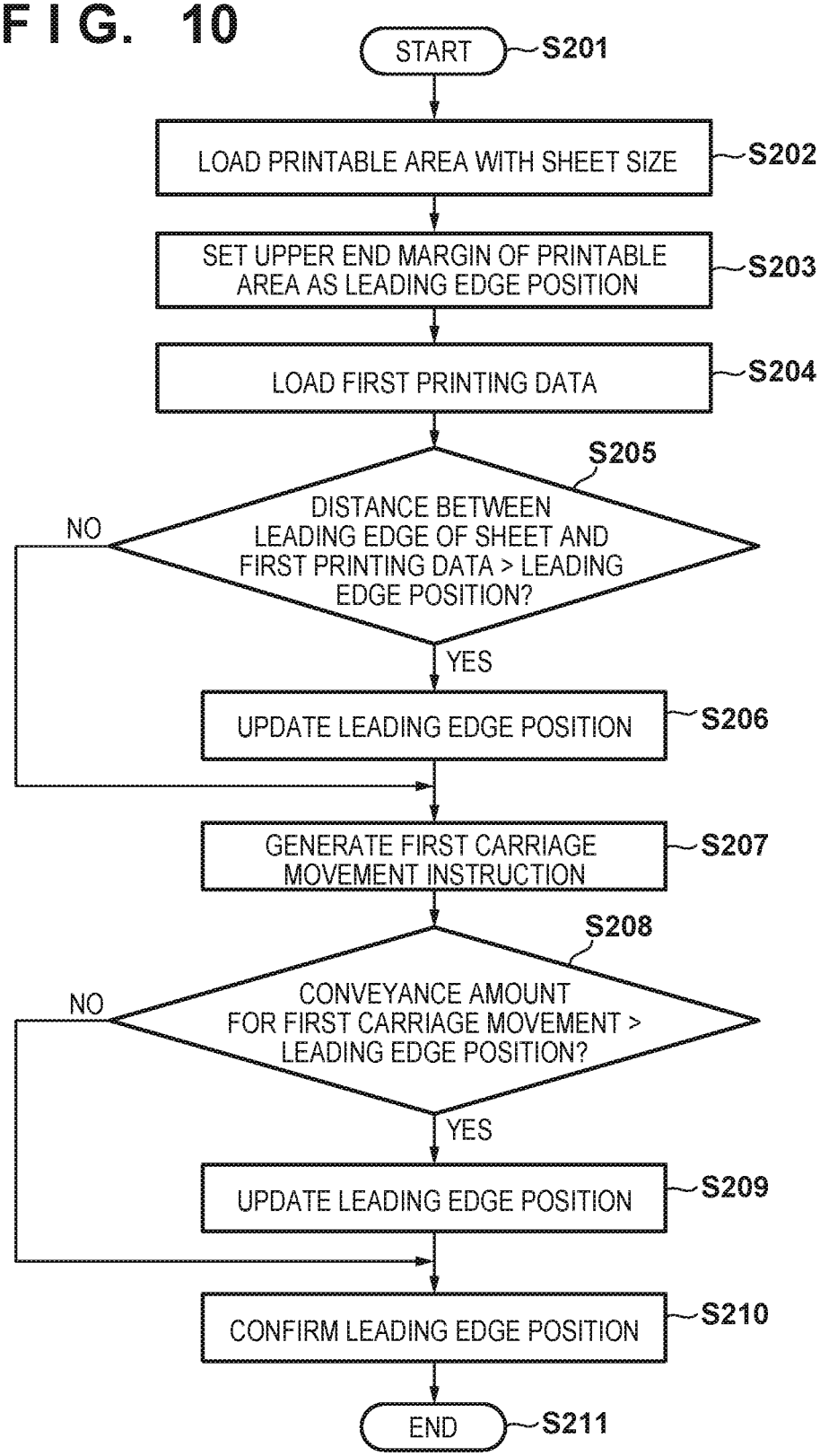

PRINTING APPARATUS, METHOD AND STORAGE MEDIUM FOR CONVEYING SHEETS INTERMITTENTLY TO PRINTHEAD WHILE CONVEYED SHEETS PARTIALLY OVERLAP

BACKGROUND OF THE INVENTION

Field of the Invention

The present invention relates to a printing apparatus for printing a sheet by a printhead and, more particularly, to a printing apparatus for conveying sheets to a printing area facing a printhead while part of a succeeding sheet overlaps part of a preceding sheet.

Description of the Related Art

Japanese Patent Laid-Open No. 2000-15881 describes a printing apparatus for controlling to make the marginal area of the leading edge of a succeeding sheet overlap the marginal area of the trailing edge of a preceding sheet, which comprises a feeding means for separating and feeding a plurality of sheets one by one, a printing means for forming an image on a sheet, a conveyance means for conveying a sheet to the printing means, a detection means for detecting a sheet, and a control means for controlling driving of the feeding means according to a signal of the detection means.

However, the apparatus described in Japanese Patent Laid-Open No. 2000-15881 can start to feed a succeeding sheet only when the marginal amount of the trailing edge of the preceding sheet and the marginal amount of the leading edge of the succeeding sheet are confirmed before the start of feeding of the succeeding sheet. This imposes a technical problem that it takes time to start to feed the succeeding sheet.

SUMMARY OF THE INVENTION

The present invention has been made in consideration of the above-described problem, and provides a printing apparatus which can perform a chasing operation to make a succeeding sheet overlap a preceding sheet.

According to the first aspect of the present invention, there is provided a printing apparatus comprising: a first feeding roller configured to feed a printing sheet stacked on a stacking unit; a feeding motor configured to drive the first feeding roller; a second feeding roller driven by the feeding motor and configured to convey the printing sheet fed by the first feeding roller; a conveyance roller configured to convey the printing sheet conveyed by the second feeding roller; a conveyance motor configured to drive the conveyance roller; a printing unit configured to print the printing sheet conveyed by the conveyance roller; a detection unit, arranged between the second feeding roller and the conveyance roller, configured to detect a leading edge of the printing sheet; and a control unit configured to, when the printing unit performs a printing operation on a preceding sheet as a printing sheet precedingly fed from the stacking unit, drive the feeding motor in synchronization with the conveyance motor before the detection unit detects a leading edge of a succeeding sheet as a printing sheet succeedingly fed from the stacking unit, and continuously drive the feeding motor so that a conveying speed of the succeeding sheet by the feeding motor becomes higher than a conveying speed of the preceding sheet by the conveyance motor after the detection unit detects the leading edge of the succeeding sheet.

According to the second aspect of the present invention, there is provided a printing apparatus comprising: a first feeding roller configured to feed a printing sheet stacked on a stacking unit; a feeding motor configured to drive the first feeding roller; a second feeding roller driven by the feeding motor and configured to convey the printing sheet fed by the first feeding roller; a conveyance roller configured to convey the printing sheet conveyed by the second feeding roller; a conveyance motor configured to drive the conveyance roller; a printing unit configured to print the printing sheet conveyed by the conveyance roller; a carriage incorporating the printing unit to move in a direction intersecting a direction in which the printing sheet is conveyed; a printing control unit configured to print an image on the printing sheet by repeating an operation of intermittently conveying the printing sheet by the conveyance roller and an operation of moving the carriage in the intersecting direction; a detection unit, arranged between the second feeding roller and the conveyance roller, configured to detect a leading edge of the printing sheet; and a control unit configured to, when the printing unit performs a printing operation on a preceding sheet as a printing sheet precedingly fed from the stacking unit, intermittently drive the feeding motor in synchronization with the conveyance motor before the detection unit detects a leading edge of a succeeding sheet as a printing sheet succeedingly fed from the stacking unit, and continuously drive the feeding motor after the detection unit detects the leading edge of the succeeding sheet.

According to the third aspect of the present invention, there is provided a method of controlling a printing apparatus including a first feeding roller configured to feed a printing sheet stacked on a stacking unit, a feeding motor configured to drive the first feeding roller, a second feeding roller driven by the feeding motor and configured to convey the printing sheet fed by the first feeding roller, a conveyance roller configured to convey the printing sheet conveyed by the second feeding roller, a conveyance motor configured to drive the conveyance roller, a printing unit configured to print the printing sheet conveyed by the conveyance roller, and a detection unit, arranged between the second feeding roller and the conveyance roller, configured to detect a leading edge of the printing sheet, the method comprising: a control step of, when the printing unit performs a printing operation on a preceding sheet as a printing sheet precedingly fed from the stacking unit, driving the feeding motor in synchronization with the conveyance motor before the detection unit detects a leading edge of a succeeding sheet as a printing sheet succeedingly fed from the stacking unit, and continuously driving the feeding motor so that a conveying speed of the succeeding sheet by the feeding motor becomes higher than a conveying speed of the preceding sheet by the conveyance motor after the detection unit detects the leading edge of the succeeding sheet.

According to the fourth aspect of the present invention, there is provided a method of controlling a printing apparatus including a first feeding roller configured to feed a printing sheet stacked on a stacking unit, a feeding motor configured to drive the first feeding roller, a second feeding roller driven by the feeding motor and configured to convey the printing sheet fed by the first feeding roller, a conveyance roller configured to convey the printing sheet conveyed by the second feeding roller, a conveyance motor configured to drive the conveyance roller, a printing unit configured to print the printing sheet conveyed by the conveyance roller, a carriage incorporating the printing unit to move in a direction intersecting a direction in which the printing sheet is conveyed, printing a control unit configured to print an image on the printing sheet by repeating an operation of intermittently conveying the printing sheet by the conveyance roller and an operation of moving the carriage in the intersecting direction, and a detection unit, arranged between the second feeding roller and the conveyance roller, configured to detect a leading edge of the printing sheet, the method comprising: a control step of, when the printing unit performs a printing operation on a preceding sheet as a printing sheet precedingly fed from the stacking unit, intermittently driving the feeding motor in synchronization with the conveyance motor before the detection unit detects a leading edge of a succeeding sheet as a printing sheet succeedingly fed from the stacking unit, and continuously driving the feeding motor after the detection unit detects the leading edge of the succeeding sheet.

Further features of the present invention will become apparent from the following description of exemplary embodiments with reference to the attached drawings.

BRIEF DESCRIPTION OF THE DRAWINGS

FIG. 2 is a view for explaining the overlap continuous feeding operation in the printing apparatus according to the first embodiment of the present invention;

FIG. 10 is a flowchart for explaining an operation of calculating the leading edge position of the succeeding sheet.

DESCRIPTION OF THE EMBODIMENTS

Embodiments of the present invention will be described in detail below with reference to the accompanying drawings.

First Embodiment

Figure 1:
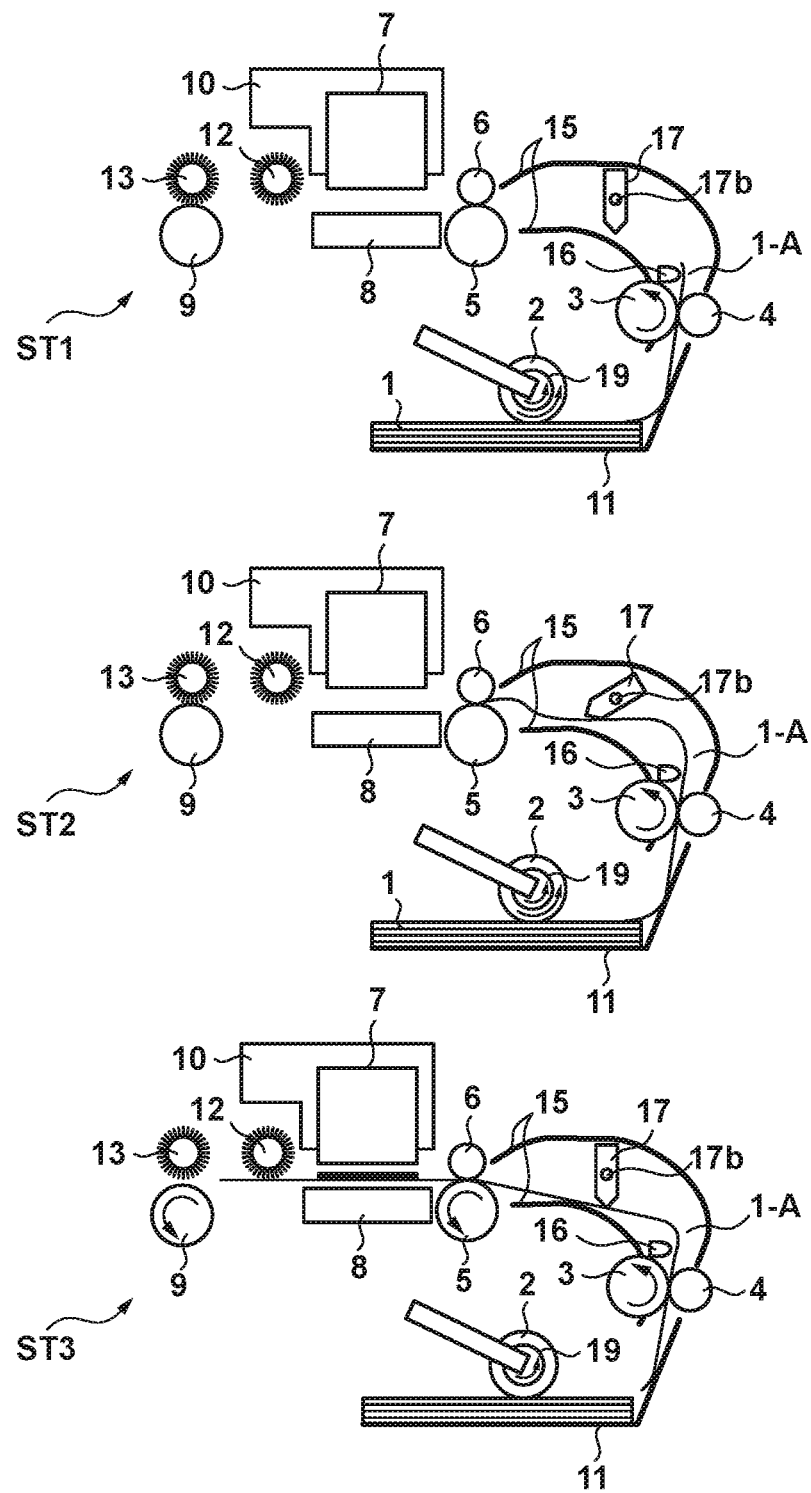
FIG. 1 is a view for explaining an overlap continuous feeding operation in a printing apparatus according to the first embodiment of the present invention.
Figure 3:
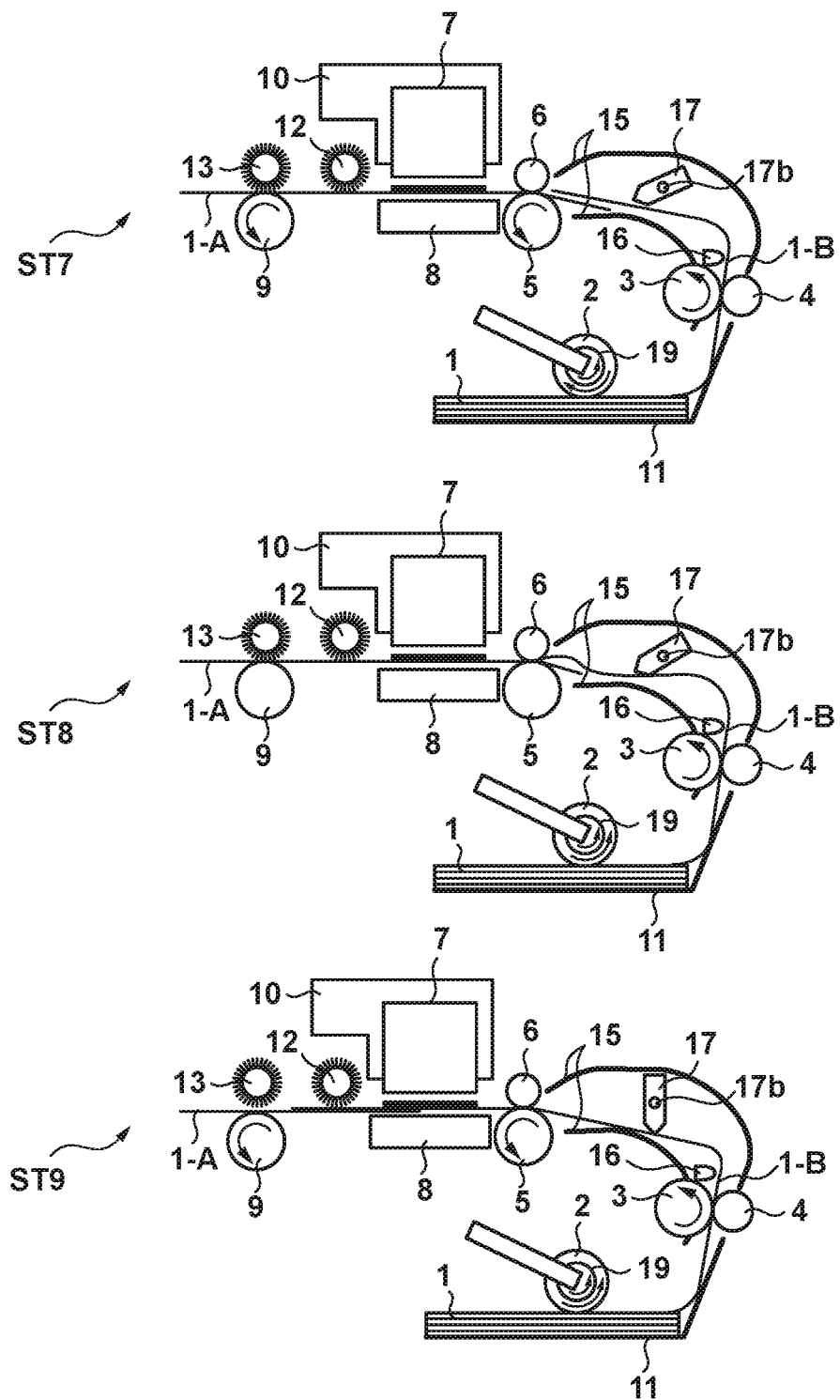
FIG. 3 is a view for explaining the overlap continuous feeding operation in the printing apparatus according to the first embodiment of the present invention.

FIGS. 1 to 3 are sectional views for explaining an overlap continuous feeding operation in a printing apparatus according to the first embodiment of the present invention. The schematic arrangement of the printing apparatus according to the embodiment will first be described with reference to ST1 of FIG. 1.

In ST1 of FIG. 1, reference numeral 1 denotes printing sheets. The plurality of printing sheets 1 are stacked on a feeding tray 11 (a stacking unit). A pickup roller 2 abuts against the top printing sheet 1 stacked on the feeding tray 11 to pick it up. A feeding roller 3 feeds the printing sheet 1 picked up by the pickup roller 2 toward the downstream side of a sheet conveyance direction. A feeding driven roller 4 is biased against the feeding roller 3 to sandwich the printing sheet 1 with the feeding roller 3, thereby feeding the printing sheet 1.

A conveyance roller 5 conveys the printing sheet 1 fed by the feeding roller 3 and feeding driven roller 4 to a position facing a printhead 7. A pinch roller 6 is biased against the conveyance roller 5 to sandwich the printing sheet with the conveyance roller 5, thereby conveying the printing sheet.

The printhead 7 prints the printing sheet 1 conveyed by the conveyance roller 5 and pinch roller 6. In this embodiment, an inkjet printhead which prints the printing sheet 1 by discharging ink from the printhead will be exemplified. A platen 8 supports the reverse surface of the printing sheet 1 at the position facing the printhead 7. A carriage 10 mounts the printhead 7 and moves in a direction intersecting the sheet conveyance direction.

A discharge roller 9 discharges the printing sheet printed by the printhead 7 to the outside of the apparatus. Spurs 12 and 13 rotate while they are in contact with the printing surface of the printing sheet printed by the printhead 7. The spur 13 on the downstream side is biased against the discharge roller 9, and no discharge roller 9 is arranged at a position facing the spur 12 on the upstream side. The spur 12 is used to prevent the floating of the printing sheet 1, and is also referred to as a pressing spur.

A conveyance guide 15 guides the printing sheet 1 between a feeding nip portion formed by the feeding roller 3 and feeding driven roller 4 and a conveyance nip portion formed by the conveyance roller 5 and pinch roller 6. A sheet detection sensor 16 detects the leading edge and trailing edge of the printing sheet 1. The sheet detection sensor 16 is provided downstream of the feeding roller 3 in the sheet conveyance direction. A sheet pressing lever 17 makes the leading edge of the succeeding sheet overlap the trailing edge of the preceding sheet. The sheet pressing lever 17 is biased by a spring around a rotating shaft 17b in a counterclockwise direction in FIG. 1.

Figure 4A:
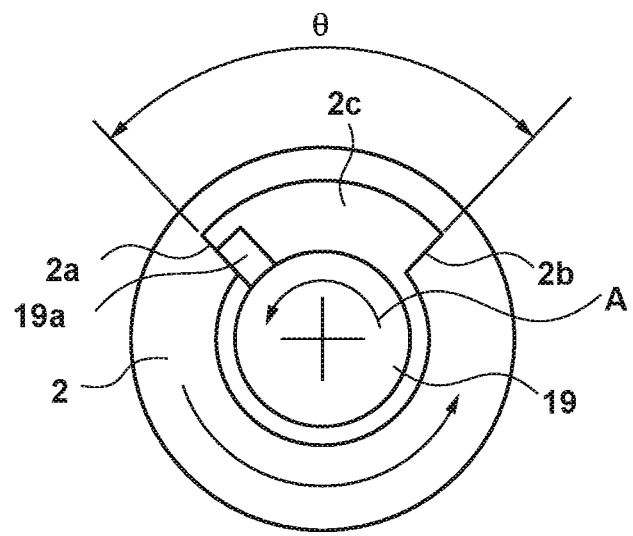
FIGS. 4A and 4B are views for explaining the arrangement of a pickup roller.
Figure 4B:
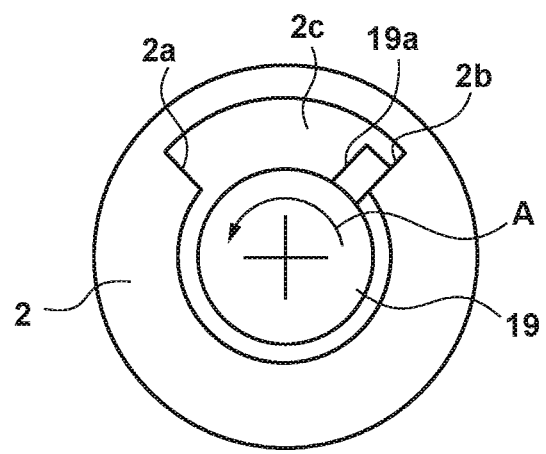

FIGS. 4A and 4B are views for explaining the arrangement of the pickup roller 2. As described above, the pickup roller 2 abuts against the top printing sheet stacked on the feeding tray 11 to pick it up. A driving shaft 19 transmits driving of a feeding motor (to be described later) to the pickup roller 2. When picking up the printing sheet, the driving shaft 19 and the pickup roller 2 rotate in a direction indicated by an arrow A in FIGS. 4A and 4B. A projection 19a is formed in the driving shaft 19. A concave portion 2c in which the projection 19a fits is formed in the pickup roller 2. As shown in FIG. 4A, when the projection 19a abuts against a first surface 2a of the concave portion 2c of the pickup roller 2, driving of the driving shaft 19 is transmitted to the pickup roller 2. In this case, when the driving shaft 19 is driven, the pickup roller 2 is also rotated. On the other hand, as shown in FIG. 4B, when the projection 19a abuts against a second surface 2b of the concave portion 2c of the pickup roller 2, driving of the driving shaft 19 is not transmitted to the pickup roller 2. In this case, even if the driving shaft 19 is driven, the pickup roller 2 is not rotated. Also, when the projection 19a is formed between the first surface 2a and the second surface 2b without abutting against the first surface 2a or the second surface 2b, even if the driving shaft 19 is driven, the pickup roller 2 is not rotated.

Figure 5:
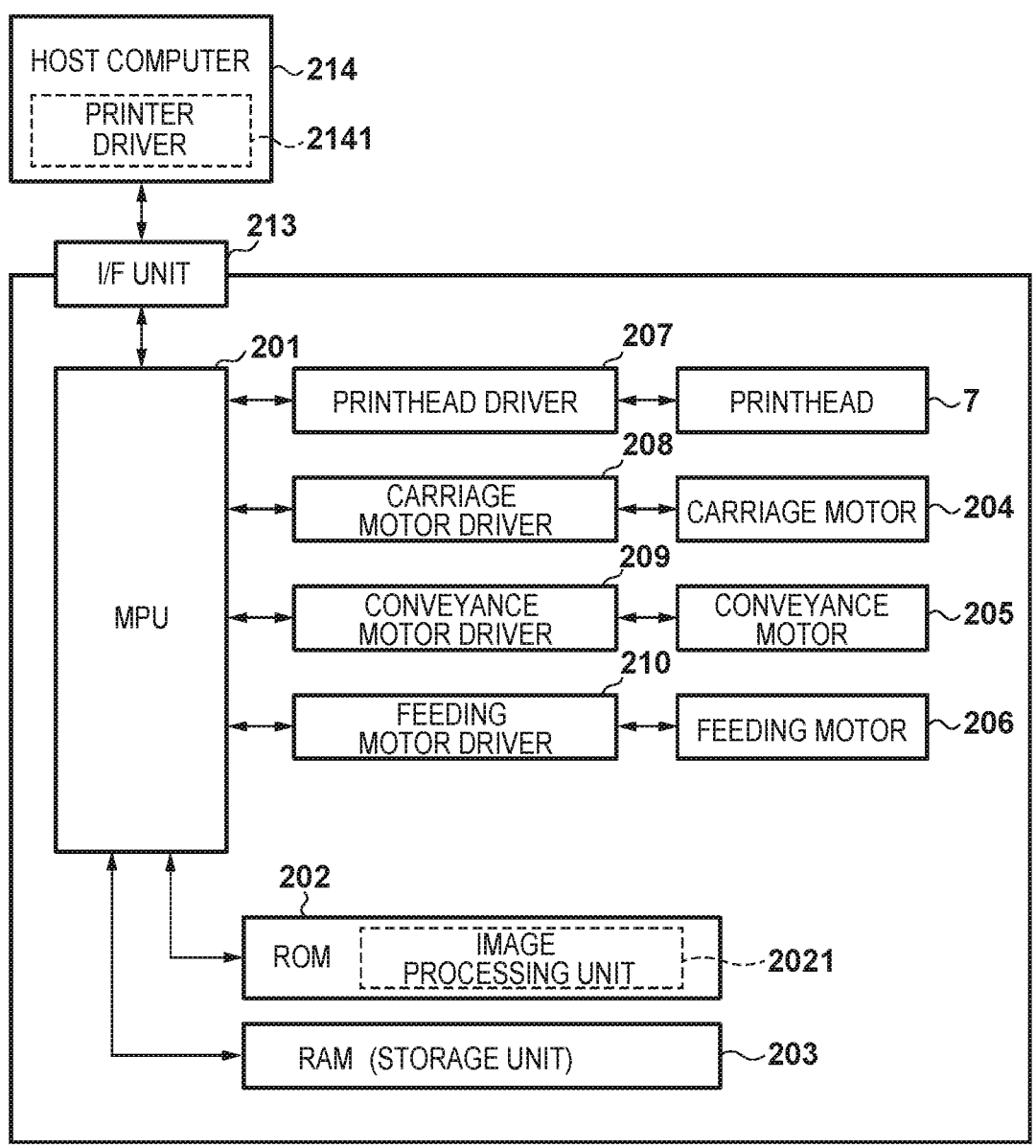
FIG. 5 is a block diagram showing the printing apparatus according to the first embodiment.

FIG. 5 is a block diagram showing the printing apparatus according to this embodiment. An MPU 201 controls the operation of each unit, data processing, and the like. As will be described later, the MPU 201 also functions as a conveyance control means capable of controlling conveyance of the printing sheets so that the trailing edge of a preceding sheet and the leading edge of a succeeding sheet overlap each other. A ROM 202 stores data and programs to be executed by the MPU 201. A RAM 203 temporarily stores processing data to be executed by the MPU 201 and data received from a host computer 214.

A printhead driver 207 controls the printhead 7. A carriage motor driver 208 controls a carriage motor 204 for driving the carriage 10. A conveyance motor 205 drives the conveyance roller 5 and discharge roller 9. A conveyance motor driver 209 controls the conveyance motor 205. A feeding motor 206 drives the pickup roller 2 and feeding roller 3. A feeding motor driver 210 controls the feeding motor 206.

In the host computer 214, a printer driver 2141 is used to communicate with the printing apparatus by collecting printing information such as a printing image and printing image quality when the user instructs the execution of a printing operation. The MPU 201 exchanges the printing image and the like with the host computer 214 via an I/F unit 213.

The overlap continuous feeding operation will be described in time series with reference to ST1 to ST9 of FIGS. 1 to 3. When the host computer 214 transmits printing data via the I/F unit 213, the printing data is processed by the MPU 201, and then loaded into the RAM 203. The MPU 201 starts a printing operation based on the loaded data.

A description will be provided with reference to ST1 of FIG. 1. The feeding motor driver 210 drives the feeding motor 206 at low speed. This rotates the pickup roller 2 (first feeding roller) at 7.6 inches/sec. When the pickup roller 2 rotates, the top printing sheet (a preceding sheet 1-A) stacked on the feeding tray 11 is picked up. The preceding sheet 1-A picked up by the pickup roller 2 is conveyed by the feeding roller 3 (a second feeding roller) rotating in the same direction as that of the pickup roller 2. The feeding motor 206 also drives the feeding roller 3.

When the sheet detection sensor 16 provided on the downstream side of the feeding roller 3 detects the leading edge of the preceding sheet 1-A, the feeding motor 206 is switched to high-speed driving. That is, the pickup roller 2 and feeding roller 3 rotate at 20 inches/sec.

A description will be provided with reference to ST2 of FIG. 1. When the feeding roller 3 is continuously rotated, the leading edge of the preceding sheet 1-A rotates the sheet pressing lever 17 about the rotating shaft 17*b* in the clockwise direction against the biasing force of the spring. When the feeding roller 3 is further continuously rotated, the leading edge of the preceding sheet 1-A abuts against the conveyance nip portion formed by the conveyance roller 5 and pinch roller 6. At this time, the conveyance roller 5 stops. By rotating the feeding roller 3 by a predetermined amount even after the leading edge of the preceding sheet 1-A abuts against the conveyance nip portion, alignment of the preceding sheet 1-A is performed to correct the skew while the leading edge of the preceding sheet 1-A abuts against the conveyance nip portion. The skew correction operation will also be referred to as a registration adjustment operation.

A description will be provided with reference to ST3 of FIG. 1. Upon end of the skew correction operation of the preceding sheet 1-A, the conveyance motor 205 is driven to start rotation of the conveyance roller 5. The conveyance roller 5 conveys the sheet at 15 inches/sec. After the preceding sheet 1-A is aligned with the position facing the printhead 7, a printing operation is performed by discharging ink from the printhead 7 based on the printing data. Note that the alignment operation is performed by making the leading edge of the printing sheet abut against the conveyance nip portion to temporarily position the printing sheet at the position of the conveyance roller 5, and controlling the rotation amount of the conveyance roller 5 with reference to the position of the conveyance roller 5.

The printing apparatus of this embodiment is a serial type printing apparatus in which the carriage 10 mounts the printhead 7. An operation of printing the printing sheet is performed by repeating a conveyance operation of intermittently conveying the printing sheet by a predetermined amount using the conveyance roller 5 and an image forming operation of discharging ink from the printhead 7 while moving the carriage 10 incorporating the printhead 7 when the conveyance roller 5 stops.

When alignment of the preceding sheet 1-A is performed, the feeding motor 206 is switched to low-speed driving. That is, the pickup roller 2 and feeding roller 3 rotate at 7.6 inches/sec. While the conveyance roller 5 intermittently conveys the printing sheet by the predetermined amount, the feeding motor 206 also intermittently drives the feeding roller 3. That is, while the conveyance roller 5 rotates, the feeding roller 3 also rotates. While the conveyance roller 5 stops, the feeding roller 3 also stops. The rotation speed of the feeding roller 3 is lower than that of the conveyance roller 5. Consequently, the sheet is stretched between the conveyance roller 5 and the feeding roller 3. The feeding roller 3 is rotated together with the printing sheet conveyed by the conveyance roller 5.

Since the feeding motor 206 is intermittently driven, the driving shaft 19 is also driven. As described above, the rotation speed of the pickup roller 2 is lower than that of the conveyance roller 5. Consequently, the pickup roller 2 is rotated together with the printing sheet conveyed by the conveyance roller 5. That is, the pickup roller 2 rotates ahead of the driving shaft 19. More specifically, the projection 19*a* of the driving shaft 19 is spaced apart from the first surface 2*a* and abuts against the second surface 2*b*. Therefore, the second printing sheet (a succeeding sheet 1-B) is not picked up soon after the trailing edge of the preceding sheet 1-A passes through the pickup roller 2. After the driving shaft 19 is driven for a predetermined time, the projection 19*a* abuts against the first surface 2*a* and the pickup roller 2 starts to rotate.

A description will be provided with reference to ST4 of FIG. 2. In ST4, a state in which the pickup roller 2 starts to rotate, and picks up the succeeding sheet 1-B is shown. Due to a factor such as the responsiveness of the sensor, the sheet detection sensor 16 requires a predetermined interval or more between the printing sheets to detect the edges of the printing sheets. That is, it is necessary to separate the leading edge of the succeeding sheet 1-B from the trailing edge of the preceding sheet 1-A by a predetermined distance to provide a predetermined time interval from when the sheet detection sensor 16 detects the trailing edge of the preceding sheet 1-A until it detects the leading edge of the succeeding sheet 1-B. To achieve this, the angle of the concave portion 2*c* of the pickup roller 2 is set to about 70°.

A description will be provided with reference to ST5 of FIG. 2. The succeeding sheet 1-B picked up by the pickup roller 2 is conveyed by the feeding roller 3. At this time, the preceding sheet 1-A undergoes an image forming operation by the printhead 7 based on the printing data. When the sheet detection sensor 16 detects the leading edge of the succeeding sheet 1-B, the feeding motor 206 is switched to high-speed driving. That is, the pickup roller 2 and feeding roller 3 rotate at 20 inches/sec.

A description will be provided with reference to ST6 of FIG. 2. The sheet pressing lever 17 presses the trailing edge of the preceding sheet 1-A downward, as shown in ST5 of FIG. 2. It is possible to form a state in which the leading edge of the succeeding sheet 1-B overlaps the trailing edge of the preceding sheet 1-A by moving the succeeding sheet 1-B at a speed higher than that at which the preceding sheet 1-A moves downstream by the printing operation of the printhead 7 (ST6 of FIG. 2). Since the preceding sheet 1-A undergoes the printing operation based on the printing data, it is intermittently conveyed by the conveyance roller 5. On the other hand, after the sheet detection sensor 16 detects the leading edge of the succeeding sheet 1-B, the succeeding sheet 1-B can catch up with the preceding sheet 1-A by continuously rotating the feeding roller 3 at 20 inches/sec.

A description will be provided with reference to ST7 of FIG. 3. After forming an overlap state in which the leading edge of the succeeding sheet 1-B overlaps the trailing edge of the preceding sheet 1-A, the succeeding sheet 1-B is conveyed by the feeding roller 3 until the leading edge of the succeeding sheet 1-B stops at a predetermined position upstream of the conveyance nip portion. The position of the leading edge of the succeeding sheet 1-B is calculated from the rotation amount of the feeding roller 3 after the sheet detection sensor 16 detects the leading edge of the succeeding sheet 1-B, and controlled based on the calculation result. At this time, the preceding sheet 1-A undergoes an image forming operation based on the printing data by the printhead 7.

A description will be provided with reference to ST8 of FIG. 3. When the conveyance roller 5 stops to perform the image forming operation (ink discharge operation) of the last row of the preceding sheet 1-A, the feeding roller 3 is driven to make the leading edge of the printing sheet 1-B abut against the conveyance nip portion, thereby performing the skew correction operation of the succeeding sheet 1-B.

A description will be provided with reference to ST9 of FIG. 3. When the image forming operation of the last row of the preceding sheet 1-A ends, it is possible to perform alignment of the succeeding sheet 1-B while keeping the state in which the succeeding sheet 1-B overlaps the preceding sheet 1-A by rotating the conveyance roller 5 by a predetermined amount. The succeeding sheet 1-B undergoes a printing operation by the printhead 7 based on the printing data. When the succeeding sheet 1-B is intermittently conveyed for the printing operation, the preceding sheet 1-A is also intermittently conveyed, and is finally discharged outside the printing apparatus by the discharge roller 9.

When alignment of the succeeding sheet 1-B is performed, the feeding motor 206 is switched to low-speed driving. That is, the pickup roller 2 and feeding roller 3 rotate at 7.6 inches/sec. If there is printing data even after the succeeding sheet 1-B, the process returns to ST4 of FIG. 2 to pick up the third printing sheet.

Figure 6A:
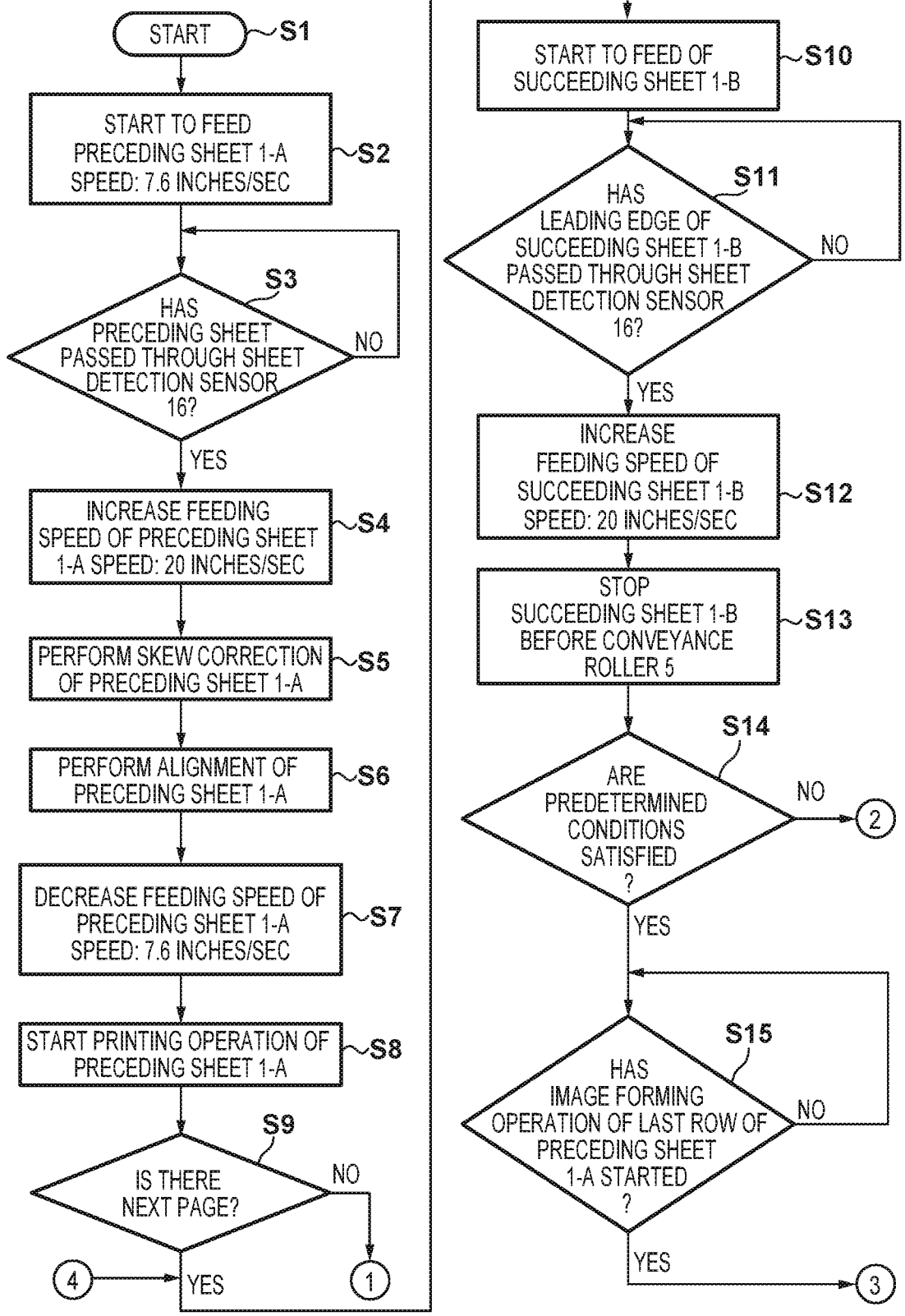
FIGS. 6A and 6B are flowcharts illustrating the overlap continuous feeding operation according to the first embodiment.
Figure 6B:
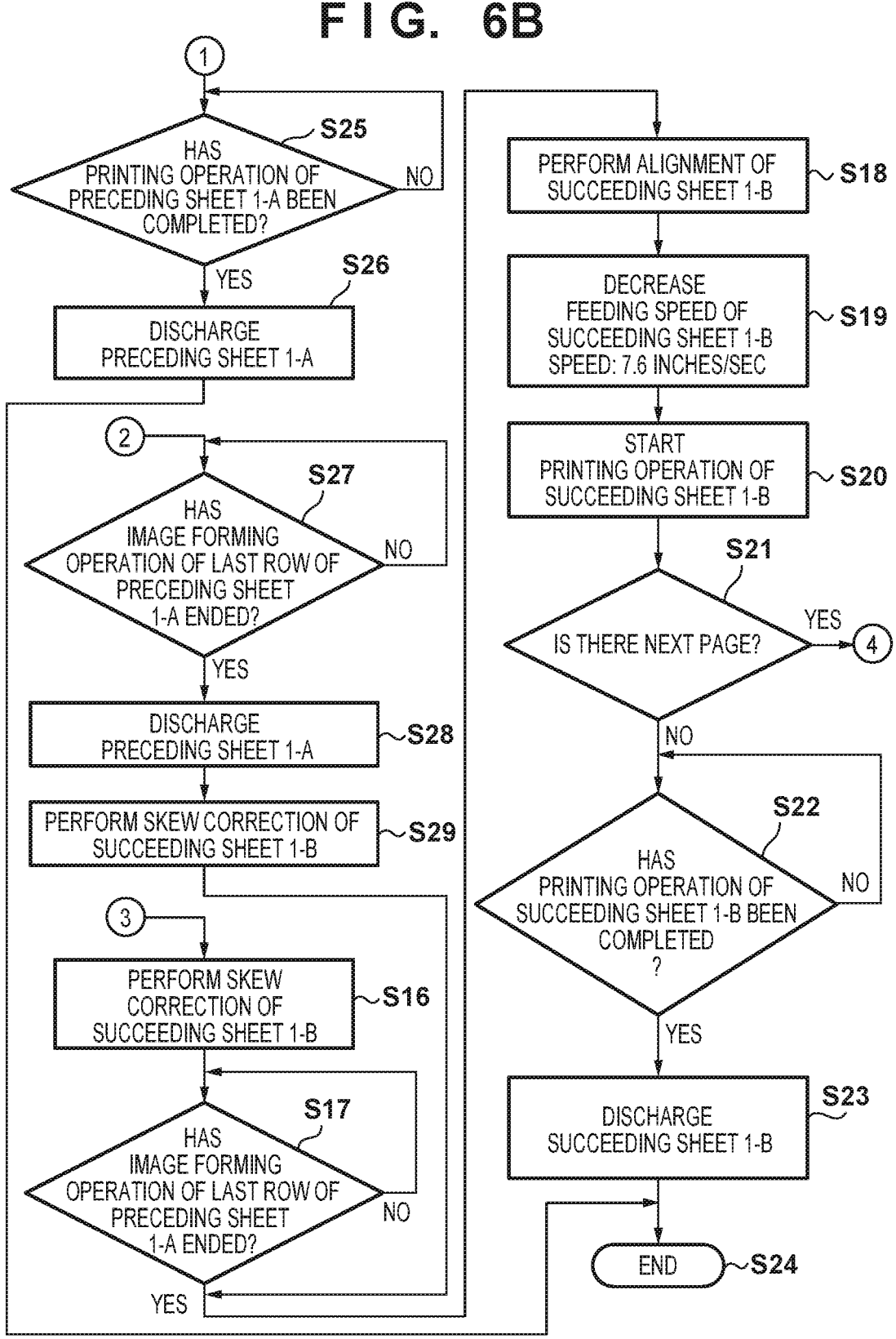

FIGS. 6A and 6B are flowcharts illustrating the overlap continuous feeding operation according to this embodiment. In step S1, when the host computer 214 transmits printing data via the I/F unit 213, a printing operation starts. In step S2, the feeding operation of the preceding sheet 1-A starts. More specifically, the feeding motor 206 is driven at low speed. The pickup roller 2 rotates at 7.6 inches/sec. The pickup roller 2 picks up the preceding sheet 1-A, and the feeding roller 3 feeds the preceding sheet 1-A toward the printhead 7.

In step S3, the sheet detection sensor 16 detects the leading edge of the preceding sheet 1-A. When the sheet detection sensor 16 detects the leading edge of the preceding sheet 1-A, the feeding motor 206 is switched to high-speed driving in step S4. That is, the pickup roller 2 and feeding roller 3 rotate at 20 inches/sec. In step S5, by controlling the rotation amount of the feeding roller 3 after the sheet detection sensor 16 detects the leading edge of the preceding sheet 1-A, the leading edge of the preceding sheet 1-A is made to abut against the conveyance nip portion to perform the skew correction operation of the preceding sheet 1-A.

In step S6, alignment of the preceding sheet 1-A is performed based on the printing data. That is, the preceding sheet 1-A is conveyed to a printing start position with reference to the position of the conveyance roller 5 based on the printing data by controlling the rotation amount of the conveyance roller 5. In step S7, the feeding motor 206 is switched to low-speed driving. In step S8, a printing operation starts when the printhead 7 discharges ink to the preceding sheet 1-A. More specifically, the printing operation of the preceding sheet 1-A is performed by repeating a conveyance operation of intermittently conveying the preceding sheet 1-A by the conveyance roller 5 and an image forming operation (ink discharge operation) of discharging ink from the printhead 7 by moving the carriage 10. The feeding motor 206 is intermittently driven at low speed in synchronization with the operation of intermittently conveying the preceding sheet 1-A by the conveyance roller 5. That is, the pickup roller 2 and feeding roller 3 intermittently rotate at 7.6 inches/sec.

In step S9, it is determined whether there is printing data of the next page. If there is no printing data of the next page, the process advances to step S25. Upon completion of the printing operation of the preceding sheet 1-A in step S25, the preceding sheet 1-A is discharged in step S26, thereby terminating the printing operation.

If there is printing data of the next page, the feeding operation of the succeeding sheet 1-B starts in step S10. More specifically, the pickup roller 2 picks up the succeeding sheet 1-B, and the feeding roller 3 feeds the succeeding sheet 1-B toward the printhead 7. The pickup roller 2 rotates at 7.6 inches/sec. As described above, since the large concave portion 2c of the pickup roller 2 is provided with respect to the projection 19a of the driving shaft 19, the succeeding sheet 1-B is fed while having a predetermined interval with respect to the trailing edge of the preceding sheet 1-A.

In step S11, the sheet detection sensor 16 detects the leading edge of the succeeding sheet 1-B. When the sheet detection sensor 16 detects the leading edge of the succeeding sheet 1-B, the feeding motor 206 is switched to high-speed driving in step S12. That is, the pickup roller 2 and feeding roller 3 rotate at 20 inches/sec. In step S13, by controlling the rotation amount of the feeding roller 3 after the sheet detection sensor 16 detects the leading edge of the succeeding sheet 1-B, the succeeding sheet 1-B is conveyed so that its leading edge is at a position a predetermined amount before the conveyance nip portion. The preceding sheet 1-A is intermittently conveyed based on the printing data. Continuously driving the feeding motor 206 at high speed forms the overlap state in which the leading edge of the succeeding sheet 1-B overlaps the trailing edge of the preceding sheet 1-A.

In step S14, it is determined whether predetermined conditions (to be described later) are satisfied. If the predetermined conditions are satisfied, it is determined in step S15 whether the image forming operation of the preceding sheet 1-A has started. If it is determined that the image forming operation has started, the process advances to step S16; otherwise, the process stands by until the image forming operation starts. In step S16, the leading edge of the succeeding sheet 1-B is made to abut against the conveyance nip portion while keeping the overlap state, thereby performing the skew correction operation of the succeeding sheet 1-B. If it is determined in step S17 that the image forming operation of the last row of the preceding sheet 1-A has ended, in step S18 alignment of the succeeding sheet 1-B is performed while keeping the overlap state.

If it is determined in step S14 that the predetermined conditions are not satisfied, the overlap state is canceled to perform alignment of the succeeding sheet 1-B. More specifically, if it is determined in step S27 that the image forming operation of the last row of the preceding sheet 1-A has ended, the discharge operation of the preceding sheet 1-A is performed in step S28. During this operation, the feeding motor 206 is not driven, and thus the succeeding sheet 1-B stops while its leading edge is at the position the predetermined amount before the conveyance nip portion. Since the preceding sheet 1-A is discharged, the overlap state is canceled. In step S29, the leading edge of the succeeding sheet 1-B is made to abut against the conveyance nip portion to perform the skew correction operation of the succeeding sheet 1-B. In step S18, alignment of the succeeding sheet 1-B is performed.

In step S19, the feeding motor 206 is switched to low-speed driving. In step S20, a printing operation starts by discharging ink from the printhead 7 to the succeeding sheet 1-B. More specifically, the printing operation of the succeeding sheet 1-B is performed by repeating (performing printing control) a conveyance operation of intermittently conveying the succeeding sheet 1-B by the conveyance roller 5 and an image forming operation (ink discharge operation) of discharging ink from the printhead 7 by moving the carriage 10. The feeding motor 206 is intermittently driven at low speed in synchronization with the operation of intermittently conveying the succeeding sheet 1-B by the conveyance roller 5. That is, the pickup roller 2 and feeding roller 3 intermittently rotate at 7.6 inches/sec.

In step S21, it is determined whether there is printing data of the next page. If there is printing data of the next page, the process returns to step S10. If there is no printing data of the next page, when the image forming operation of the succeeding sheet 1-B is complete in step S22, the discharge operation of the succeeding sheet 1-B is performed in step S23 and the printing operation ends in step S24.

Figure 7:
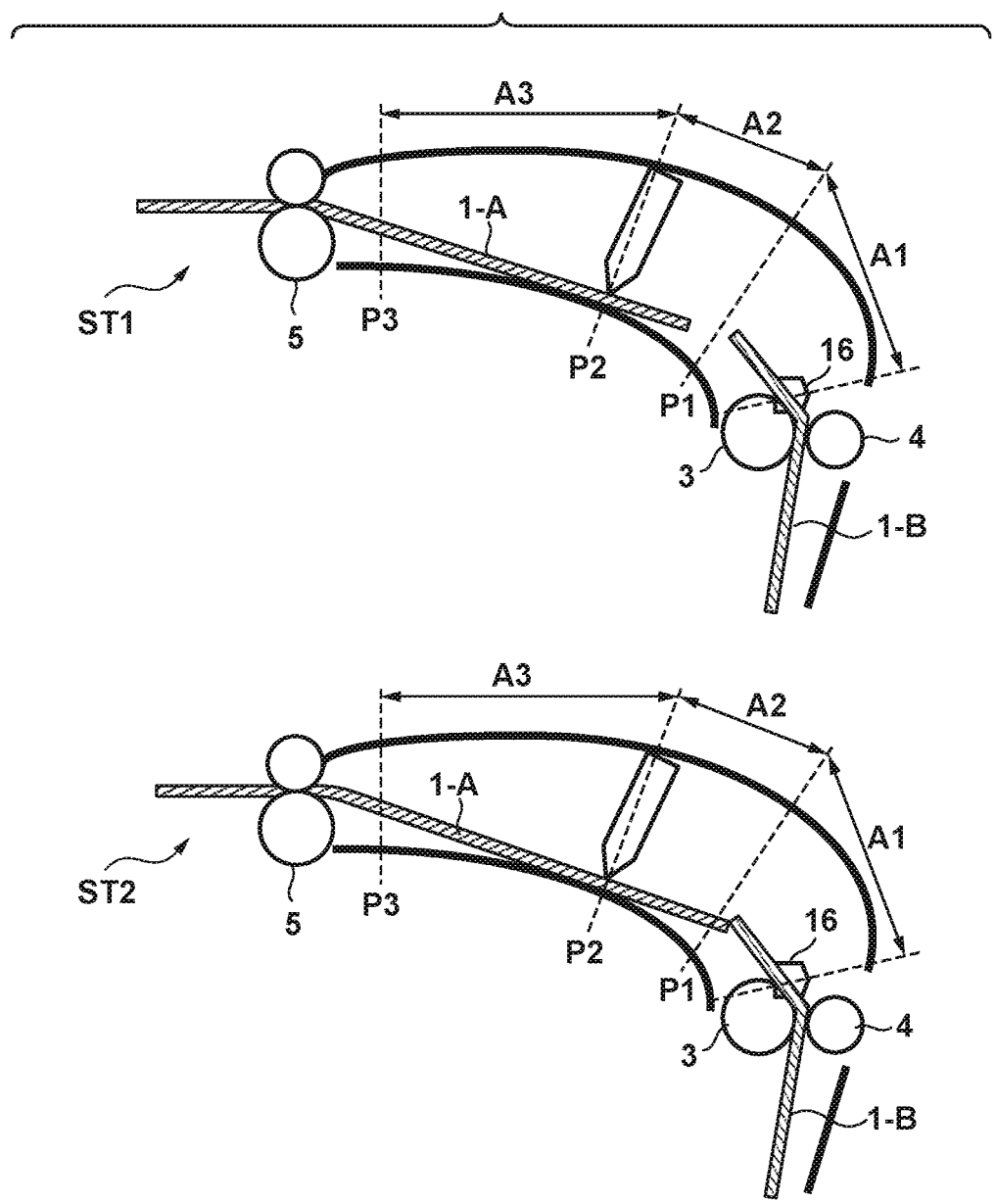
FIG. 7 is a view for explaining an operation of making a succeeding sheet overlap a preceding sheet.
Figure 8:
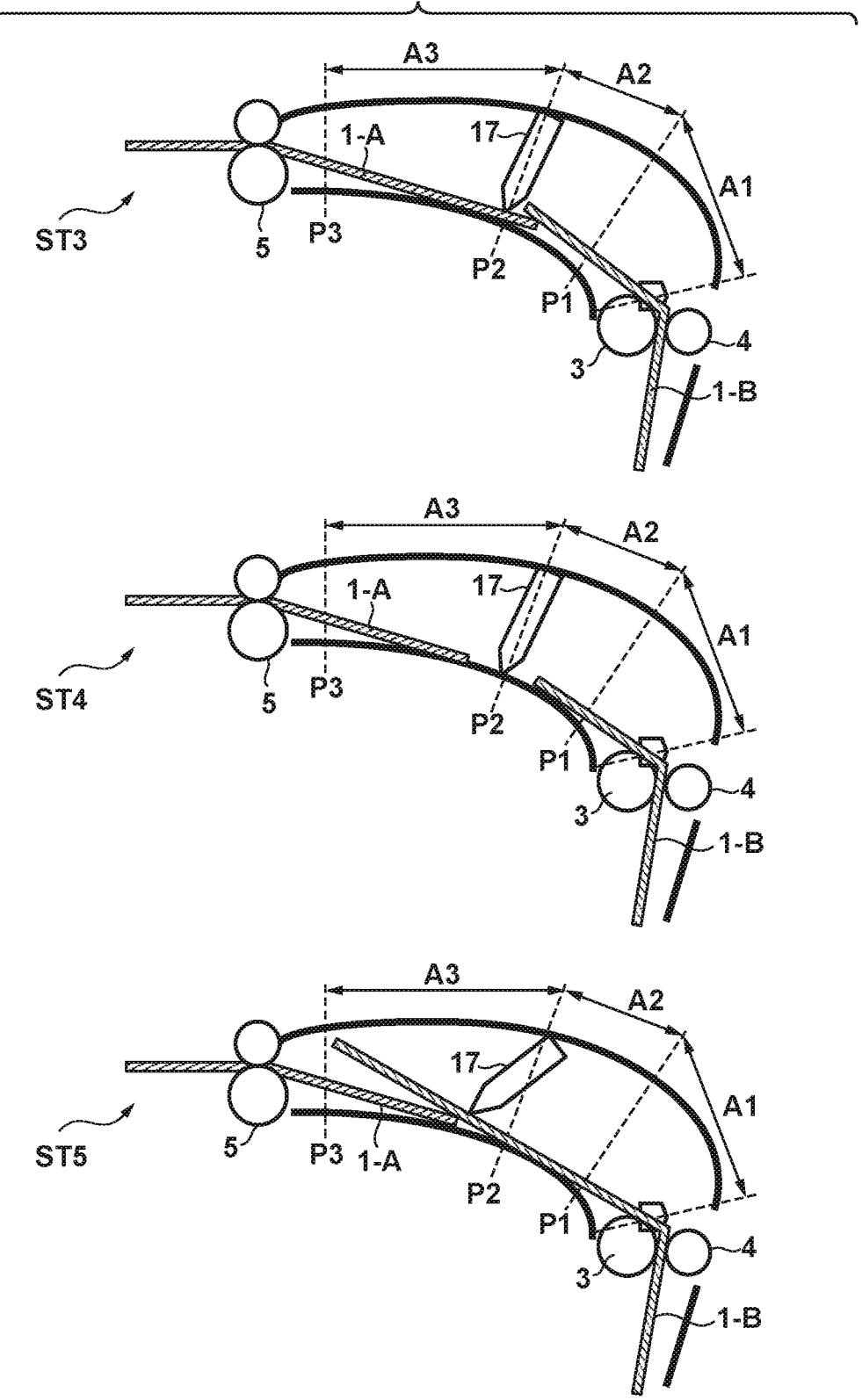
FIG. 8 is a view for explaining the operation of making the succeeding sheet overlap the preceding sheet.

FIGS. 7 and 8 are views for explaining an operation of making a succeeding sheet overlap a preceding sheet according to this embodiment. The operation of forming the overlap state in which the leading edge of the succeeding sheet overlaps the trailing edge of the preceding sheet, which has been explained in steps S12 and S13 of FIG. 6, will be described.

FIGS. 7 and 8 are enlarged views each showing a portion between the feeding nip portion formed by the feeding roller 3 and feeding driven roller 4 and the conveyance nip portion formed by the conveyance roller 5 and pinch roller 6.

Three states in a process of conveying the printing sheets by the conveyance roller 5 and feeding roller 3 will be sequentially described. The first state in which an operation of making the succeeding sheet chase the preceding sheet is performed will be described with reference to ST1 and ST2 of FIG. 7. The second state in which an operation of making the succeeding sheet overlap the preceding sheet is performed will be described with reference to ST3 and ST4 of FIG. 8. The third state in which it is determined whether to perform the skew correction operation of the succeeding sheet while keeping the overlap state will be described with reference to ST5 of FIG. 8.

In ST1 of FIG. 7, the feeding roller 3 is controlled to convey the succeeding sheet 1-B, and the sheet detection sensor 16 detects the leading edge of the succeeding sheet 1-B. A section from the sheet detection sensor 16 to a position P1 at which the succeeding sheet 1-B can be made to overlap the preceding sheet 1-A is defined as a first section A1. In the first section A1, an operation of making the leading edge of the succeeding sheet 1-B chase the trailing edge of the preceding sheet 1-A is performed. The position P1 is decided based on the arrangement of the mechanism.

In the first state, the chasing operation may stop in the first section A1. If, as shown in ST2 of FIG. 7, the leading edge of the succeeding sheet 1-B passes the trailing edge of the preceding sheet 1-A before the position P1, the operation of making the succeeding sheet overlap the preceding sheet is not performed.

In ST3 of FIG. 8, a section from the above-described position P1 to a position P2 at which the sheet pressing lever 17 is provided is defined as a second section A2. In the second section A2, the operation of making the succeeding sheet 1-B overlap the preceding sheet 1-A is performed.

In the second state, the operation of making the succeeding sheet overlap the preceding sheet may stop in the second section A2. If, as shown in ST4 of FIG. 8, the leading edge of the succeeding sheet 1-B cannot catch up with the trailing edge of the preceding sheet 1-A within the second section A2, it is impossible to perform the operation of making the succeeding sheet overlap the preceding sheet.

In ST5 of FIG. 8, a section from the above-described position P2 to a position P3 is defined as a third section A3. The position P3 is the position of the leading edge of the succeeding sheet when the succeeding sheet stops in step S13 of FIG. 6. While the succeeding sheet 1-B overlaps the preceding sheet 1-A, the succeeding sheet 1-B is conveyed so that its leading edge reaches the position P3. In the third section A3, it is determined whether to perform alignment of the succeeding sheet 1-B by making it abut against the conveyance nip portion while keeping the overlap state. That is, it is determined whether to perform alignment of the succeeding sheet by executing a skew correction operation while keeping the overlap state or to perform alignment of the succeeding sheet by canceling the overlap state and performing a skew correction operation.

Figure 9:
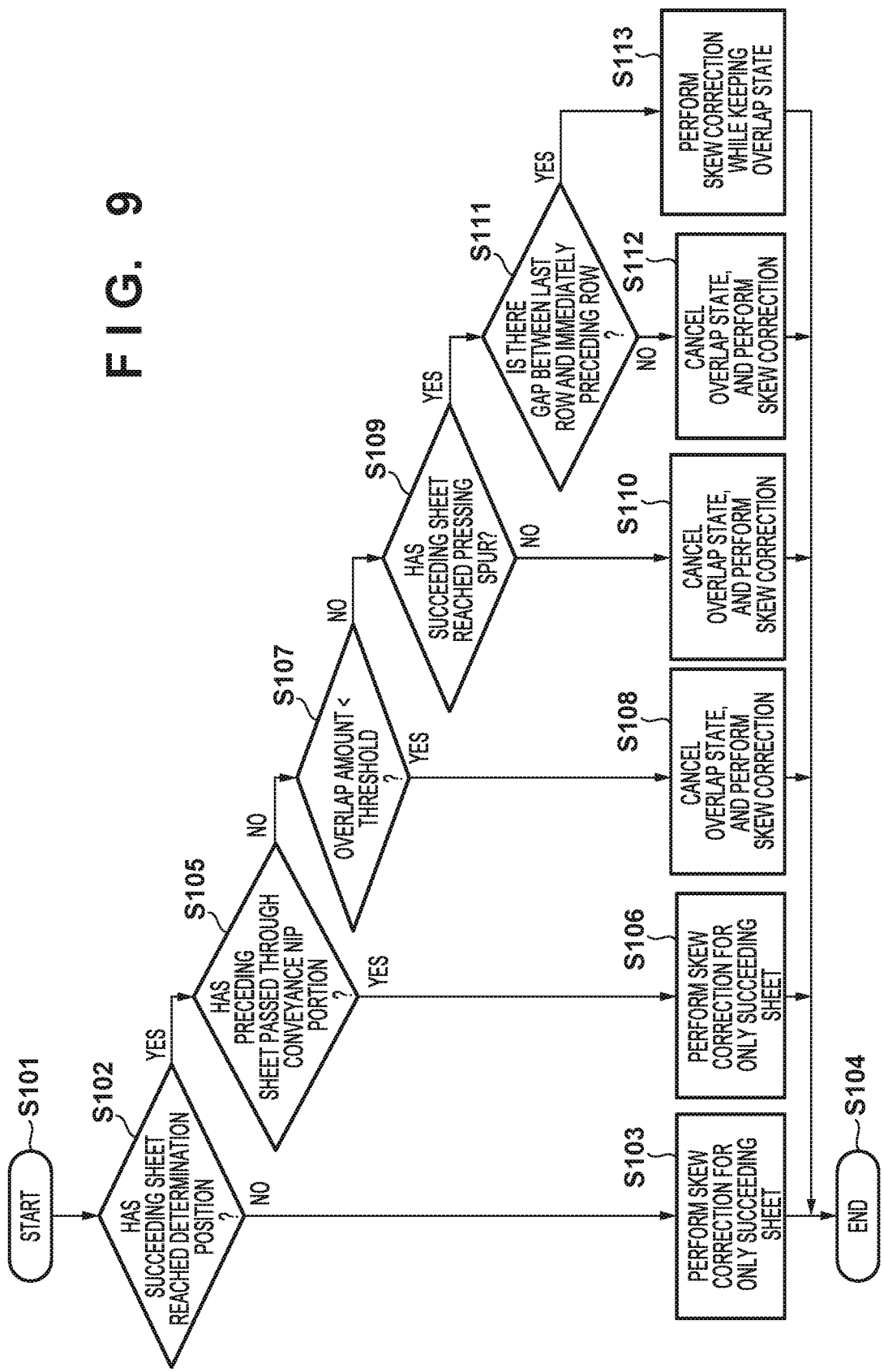
FIG. 9 is a flowchart for explaining the skew correction operation of the succeeding sheet according to the first embodiment.

FIG. 9 is a flowchart for explaining the skew correction operation of the succeeding sheet according to this embodiment. The processing of determining whether the predetermined conditions are satisfied, which has been explained in step S14 of FIG. 6, will be described in detail.

The operation of determining whether to perform a skew correction operation by making the leading edge of the succeeding sheet 1-B abut against the conveyance nip portion while keeping the overlap state between the preceding sheet 1-A and the succeeding sheet 1-B or to perform a skew correction operation by canceling the overlap state between the preceding sheet 1-A and the succeeding sheet 1-B and then making the leading edge of the succeeding sheet 1-B abut against the conveyance nip portion will be described.

In step S101, the operation starts. In step S102, it is determined whether the leading edge of the succeeding sheet 1-B has reached the determination position (the position P3 in ST5 of FIG. 8). If the leading edge of the succeeding sheet 1-B has not reached the determination position (NO in step S102), it is uncertain whether the leading edge of the succeeding sheet 1-B abuts against the conveyance nip portion by conveying the succeeding sheet 1-B by a predetermined amount, and thus a skew correction operation for only the succeeding sheet is decided (step S103), thereby terminating the determination operation (step S104). That is, after the trailing edge of the preceding sheet 1-A passes through the conveyance nip portion, only the succeeding sheet 1-B is made to abut against the conveyance nip portion to perform a skew correction operation, and then alignment of only the succeeding sheet 1-B is performed.

On the other hand, if it is determined that the succeeding sheet 1-B has reached the determination position P3 (YES in step S102), it is determined whether the trailing edge of the preceding sheet 1-A has passed through the conveyance nip portion (step S105). If it is determined that the trailing edge of the preceding sheet 1-A has passed through the conveyance nip portion (YES in step pS105), the succeeding sheet does not overlap the preceding sheet, and thus a skew correction operation for only the succeeding sheet is decided (step S106). That is, only the succeeding sheet 1-B is made to abut against the conveyance nip portion to perform a skew correction operation, and then alignment of only the succeeding sheet 1-B is performed.

On the other hand, if it is determined that the trailing edge of the preceding sheet 1-A has not passed through the conveyance nip portion (NO in step S105), it is determined whether the overlap amount of the trailing edge of the preceding sheet 1-A and the leading edge of the succeeding sheet 1-B is smaller than a threshold (step S107). The position of the trailing edge of the preceding sheet 1-A is updated along with the printing operation of the preceding sheet 1-A. The position of the leading edge of the succeeding sheet 1-B is at the above-described determination position. That is, the overlap amount decreases along with the printing operation of the preceding sheet 1-A. If it is determined that the overlap amount is smaller than the threshold (YES in step S107), the overlap state is canceled, and a skew correction operation for only the succeeding sheet is decided (step S108). That is, after the image forming operation of the preceding sheet 1-A ends, the succeeding sheet 1-B is not conveyed together with the preceding sheet 1-A. More specifically, the conveyance motor 205 drives the conveyance roller 5 to convey the preceding sheet 1-A. However, the feeding roller 3 is not driven. Therefore, the overlap state is canceled. Furthermore, only the succeeding sheet 1-B is made to abut against the conveyance nip portion to perform a skew correction operation, and then alignment of only the succeeding sheet 1-B is performed.

If it is determined that the overlap amount is equal to or larger than the threshold (NO in step S107), it is determined whether the succeeding sheet 1-B reaches the pressing spur 12 when alignment of the succeeding sheet 1-B is performed (step S109). If it is determined that the succeeding sheet 1-B does not reach the pressing spur 12 (NO in step S109), the overlap state is canceled and a skew correction operation for only the succeeding sheet is decided (step S110). That is, after the image forming operation of the preceding sheet 1-A ends, the succeeding sheet 1-B is not conveyed together with the preceding sheet 1-A. More specifically, the conveyance motor 205 drives the conveyance roller 5 to convey the preceding sheet 1-A. However, the feeding roller 3 is not driven. Consequently, the overlap state is canceled. Furthermore, only the succeeding sheet 1-B is made to abut against the conveyance nip portion to perform a skew correction operation, and then alignment of only the succeeding sheet 1-B is performed.

If it is determined that the succeeding sheet 1-B reaches the pressing spur 12 (YES in step S109), it is determined whether there is a gap between the last row of the preceding sheet and the row immediately preceding the last row (step S111). If it is determined that there is no gap (NO in step S111), the overlap state is canceled and a skew correction operation for only the succeeding sheet is decided (step S112). If it is determined that there is a gap (YES in step S111), the skew correction operation of the succeeding sheet 1-B is performed while keeping the overlap state, and alignment of the succeeding sheet 1-B is performed. That is, after the image forming operation of the preceding sheet 1-A ends, the succeeding sheet 1-B is made to abut against the conveyance nip portion while overlapping the preceding sheet 1-A. More specifically, the conveyance roller 5 and the feeding roller 3 are rotated by driving the feeding motor 206 together with the conveyance motor 205. After the skew correction operation, alignment of the succeeding sheet 1-B is performed while the succeeding sheet 1-B overlaps the preceding sheet 1-A.

As described above, the operation of determining whether to keep or cancel the overlap state between the preceding sheet 1-A and the succeeding sheet 1-B is performed.

FIG. 10 is a flowchart for explaining an arrangement of calculating the leading edge position of the succeeding sheet after alignment of the succeeding sheet according to this embodiment.

In step S201, the process starts. In step S202, a printable area with a sheet size is loaded. Since the uppermost printable position, that is, the upper end margin is specified, the upper end margin of the printable area is set as a leading edge position (step S203). Note that the leading edge position is defined by the distance from the conveyance nip portion.

The first printing data is loaded (step S204). With this processing, the position of the first printing data from the leading edge of the sheet is specified, and thus it is determined whether the distance between the leading edge of the sheet and the first printing data is larger than the previously set leading edge position (step S205). If the distance between the leading edge of the sheet and the first printing data is larger than the previously set leading edge position (YES in step S205), the leading edge position is updated by the distance between the leading edge of the sheet and the first printing data (step S206). If the distance between the leading edge of the sheet and the first printing data is equal to or smaller than the previously set leading edge position (NO in step S205), the process advances to step S207.

Next, the first carriage movement instruction is generated (step S207). It is determined whether a sheet conveyance amount for the first carriage movement is larger than the previously set leading edge position (step S208). If the sheet conveyance amount for the first carriage movement is larger than the previously set leading edge position (YES in step S208), the leading edge position is updated by the sheet conveyance amount for the first carriage movement (step S209). If the sheet conveyance amount for the first carriage movement is equal to or smaller than the previously set leading edge position (NO in step S208), the leading edge position is not updated. In this manner, the leading edge position of the succeeding sheet 1-B is confirmed (step S210), and the process ends (step S211).

As described above, according to the above embodiment, by determining whether to convey the succeeding sheet to the position facing the printhead 7 while keeping the overlap state when the leading edge of the succeeding sheet 1-B is made to overlap the trailing edge of the preceding sheet 1-A, it is possible to start to feed the succeeding sheet even if the marginal amount of the trailing edge of the preceding sheet 1-A and that of the leading edge of the succeeding sheet are not confirmed.

When performing the printing operation of the preceding sheet 1-A by the printhead 7, the feeding motor 206 is driven in synchronization with the conveyance motor 205 before the sheet detection sensor 16 detects the leading edge of the succeeding sheet 1-B, and the feeding motor 206 is continuously driven after the sheet detection sensor 16 detects the leading edge of the succeeding sheet, thereby making it possible to perform a chasing operation to make the succeeding sheet overlap the preceding sheet.

Second Embodiment

Figure 11A:
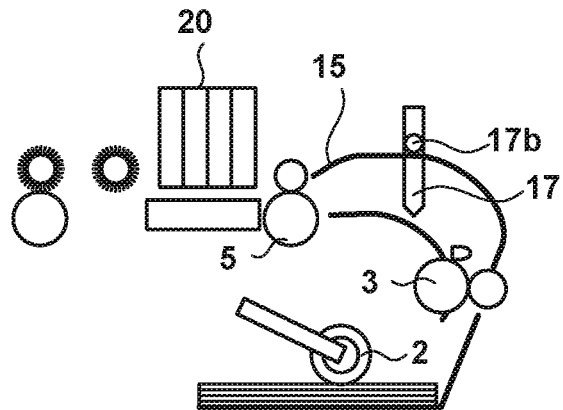
FIGS. 11A to 11C are views for explaining an overlap continuous feeding operation according to the second embodiment.
Figure 11B:
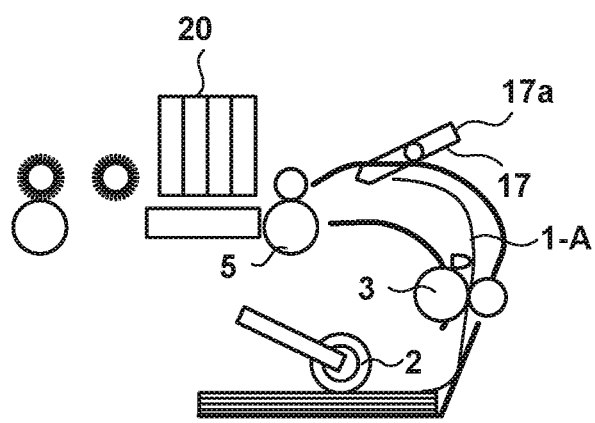
Figure 11C:
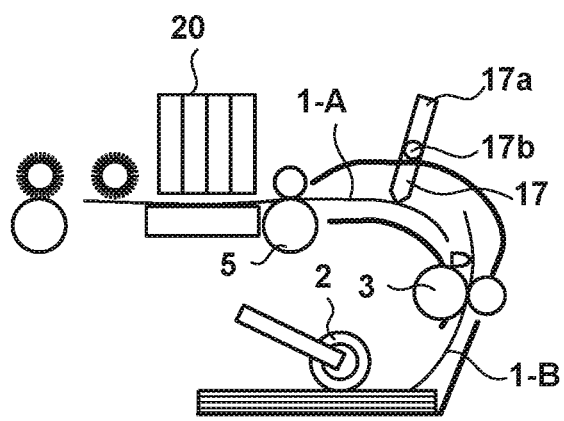

A printing apparatus according to the second embodiment of the present invention will be described next. In the first embodiment, the serial type printing apparatus in which the carriage 10 mounts the printhead 7 has been explained. To the contrary, in the second embodiment, a line type printhead 20 is used, in which inkjet nozzle array is formed within a range covering the maximum width of sheets, as shown in FIGS. 11A to 11C.

The line type printhead 20 performs, from above, print processing on a sheet conveyed by a conveyance roller 5 like the serial type printing apparatus, thereby forming an image. However, since no carriage movement operation is performed, the stop time of the conveyance roller 5 becomes unnecessary.

In the line type printhead 20, a plurality of printheads are arranged in parallel along the sheet conveyance direction. In this embodiment, the line type printhead 20 includes printheads corresponding to four colors of C (cyan), M (magenta), Y (yellow), and K (black). Note that each of the number of colors and the number of printheads is not limited to four. The respective color inks are supplied from ink tanks (not shown) to the respective color nozzles of the line type printhead 20 via ink tubes.

The same operation as in the first embodiment is performed until a pickup roller 2 picks up a preceding sheet 1-A, the conveyance roller 5 conveys it, and thus alignment of the preceding sheet 1-A is performed. After alignment of the preceding sheet 1-A is performed, the preceding sheet 1-A is continuously conveyed by the conveyance roller 5.

Note that when alignment of the preceding sheet 1-A ends, a feeding motor 206 is switched to low-speed driving in step S7 of FIG. 6. With this processing, the pickup roller 2 and a feeding roller 3 rotate at 7.6 inches/sec.

If it is determined in step S9 of FIG. 6 that there is printing data of the next page, the feeding operation of a succeeding sheet 1-B starts in step S10. As described in the first embodiment, the succeeding sheet is fed while having a predetermined interval with respect to the trailing edge of the preceding sheet.

If a sheet detection sensor 16 detects the leading edge of the succeeding sheet 1-B in step S11, the feeding motor 206 is switched to high-speed driving in step S12. The preceding sheet 1-A is printed based on printing data while being continuously conveyed, as described above. On the other hand, the feeding roller 3 conveys the succeeding sheet 1-B at a speed higher than the conveying speed of the preceding sheet 1-A by the conveyance roller 5, for example, at 20 inches/sec. Consequently, it is possible to form a state in which the leading edge of the succeeding sheet 1-B overlaps the trailing edge of the preceding sheet 1-A.

In the image forming operation by the line type printhead 20, there is no stop time of the conveyance roller 5 for the image forming operation of the last row. Therefore, when performing the skew correction operation of the succeeding sheet, the conveyance operation of the preceding sheet is temporarily stopped. By providing such stop time, in the line type printhead 20 as well, it is possible to perform a skew correction operation while the succeeding sheet overlaps the preceding sheet after performing the chasing operation and overlap operation of the preceding sheet and succeeding sheet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-046762, filed Mar. 10, 2014, which is hereby incorporated by reference herein in its entirety.

What is claimed is:

1. A printing apparatus comprising:
a first roller configured to feed a sheet;
a second roller configured to convey the sheet fed by the first roller;
a third roller configured to convey the sheet conveyed by the second roller;
a printhead configured to print an image by discharging ink on the sheet; and
a conveyance control unit configured to control conveyance of the sheet,
wherein the third roller performs intermittent driving which is repeating conveyance of the sheet and stopping conveyance of the sheet, and the printhead prints on the sheet in a state in which the third roller stops the conveyance of the sheet,
wherein the conveyance control unit controls the first roller to feed a succeeding sheet so as to have an interval between a trailing edge of a preceding sheet fed before the succeeding sheet and a leading edge of the succeeding sheet, and
wherein the conveyance control unit controls the second roller to perform intermittent driving in a state where the third roller performs the intermittent driving for printing on the preceding sheet and the preceding sheet is conveyed by the second roller, and controls the second roller to convey the succeeding sheet in a state where the third roller stops the conveyance of the preceding sheet in the intermittent driving after the trailing edge of the preceding sheet passes the second roller.

2. The apparatus according to claim 1, wherein in a state in which the conveyance of the preceding sheet stops, the conveyance control unit performs skew correction of the succeeding sheet by causing the succeeding sheet to abut against the third roller.

3. The apparatus according to claim 1, wherein a conveying speed of the succeeding sheet by the second roller in a state where the third roller stops the conveyance of the preceding sheet in the intermittent driving after the trailing edge of the preceding sheet passes the second roller is set to a speed higher than a conveying speed of the preceding sheet by the third roller.

4. The apparatus according to claim 1, wherein the conveyance control unit causes the leading edge of the succeeding sheet to overlap the preceding sheet between the second roller and the third roller.

5. The apparatus according to claim 1, wherein, in a case that the second roller performs intermittent driving, the conveyance control unit does not form an overlap state in which the leading edge of the succeeding sheet is overlapping with the preceding sheet, and in a case that the second roller conveys the succeeding sheet in a state where the third roller stops the conveyance of the preceding sheet in the intermittent driving after the trailing edge of the preceding sheet passes the second roller, the conveyance control unit forms the overlap state between the second roller and the third roller.

6. The apparatus according to claim 5, wherein the conveyance control unit conveys the succeeding sheet to a position facing the printhead while keeping the overlap state in a case that the conveyance control unit forms the overlap state.

7. The apparatus according to claim 1, wherein the conveyance control unit, after the trailing edge of the preceding sheet passes the second roller, continuously drives the second roller such that a conveyance amount of the succeeding sheet conveyed by the second roller during a predetermined time period is greater than a conveyance amount of the preceding sheet conveyed by the third roller during the predetermined time period.

8. The apparatus according to claim 1, wherein the conveyance control unit, after the trailing edge of the preceding sheet passes the second roller, stops the driving of the second roller after the leading edge of the succeeding sheet reaches a predetermined position.

9. The apparatus according to claim 8, wherein the conveyance control unit, after the driving of the second roller is stopped, performs a skew correction of the succeeding sheet by causing the succeeding sheet to abut against the third roller in a state where the third roller stops the conveyance of the preceding sheet in the intermittent driving.

10. The apparatus according to claim 9, wherein the conveyance control unit performs the skew correction of the succeeding sheet in a state in which the leading edge of the succeeding sheet is overlapping with the preceding sheet.

11. The apparatus according to claim 10, wherein the conveyance control unit conveys the succeeding sheet to a printing start position at which the printing operation is started by the printhead while keeping the overlap state.

12. A method of controlling a printing apparatus including a first roller configured to feed a sheet, a second roller configured to convey the sheet fed by the first roller, a third roller configured to convey the sheet conveyed by the second roller, and a printhead configured to print an image by discharging ink on the sheet, wherein the third roller performs intermittent driving which is repeating conveyance of the sheet and stopping conveyance of the sheet, and the printhead prints on the sheet in a state in which the third roller stops the conveyance of the sheet, the method comprising:
controlling the first roller to feed a succeeding sheet so as to have an interval between a trailing edge of a preceding sheet fed before the succeeding sheet and a leading edge of the succeeding sheet;
controlling the second roller to perform intermittent driving in a state where the third roller performs the intermittent driving for printing on the preceding sheet and the preceding sheet is conveyed by the second roller; and
controlling the second roller to convey the succeeding sheet in a state where the third roller stops the conveyance of the preceding sheet in the intermittent driving after the trailing edge of the preceding sheet passes the second roller.

13. The method according to claim 12, further comprising performing skew correction of the succeeding sheet by causing the succeeding sheet to abut against the third roller in a case that the conveyance of the preceding sheet stops.

14. The method according to claim 12, wherein a conveying speed of the succeeding sheet by the second roller in a state where the third roller stops the conveyance of the preceding sheet in the intermittent driving after the trailing edge of the preceding sheet passes the second roller is set to a speed higher than a conveying speed of the preceding sheet by the third roller.

15. The method according to claim 12, further comprising forming an overlap state in which the leading edge of the succeeding sheet is overlapping with the preceding sheet between the second roller and the third roller in a case that the second roller conveys the succeeding sheet in a state where the third roller stops the conveyance of the preceding sheet in the intermittent driving after the trailing edge of the preceding sheet passes the second roller.

16. The method according to claim 15, further comprising conveying the succeeding sheet to a position facing the printhead while keeping the overlap state after forming the overlap state.

17. The method according to claim 12, further comprising driving the second roller such that a conveyance amount of the succeeding sheet conveyed by the second roller during a predetermined time period is greater than a conveyance amount of the preceding sheet conveyed by the third roller during the predetermined time period.

18. The method according to claim 12, further comprising stopping the driving of the second roller after the leading edge of the succeeding sheet reaches a predetermined position.

19. The method according to claim 18, further comprising performing a skew correction of the succeeding sheet by causing the succeeding sheet to abut against the third roller in a state where the third roller stops the conveyance of the preceding sheet in the intermittent driving.

20. The method according to claim 19, wherein the skew correction of the succeeding sheet is performed in a state in which the leading edge of the succeeding sheet is overlapping with the preceding sheet.

21. The method according to claim 20, further comprising conveying the succeeding sheet to a printing start position at which the printing operation is started by the printhead while keeping the overlap state.

22. A printing apparatus comprising:
- a first roller configured to convey a sheet;
- a second roller configured to convey the sheet conveyed by the first roller;
- a printing unit configured to print on the sheet conveyed by the second roller; and
- a conveyance control unit configured to control conveying the sheet,
- wherein the conveyance control unit controls conveying a succeeding sheet so as to have an interval between a trailing edge of a preceding sheet conveyed before the succeeding sheet and a leading edge of the succeeding sheet, and
- wherein the conveyance control unit controls to drive the first roller in synchronization with driving of the second roller in a state where the printing unit prints on the preceding sheet and the preceding sheet is conveyed by the first roller, and to drive the first roller not in synchronization with driving of the second roller so as to make the succeeding sheet catch up with the preceding sheet in a state where the printing unit prints on the preceding sheet after the trailing edge of the preceding sheet passes the first roller.

23. The printing apparatus according to claim 22, wherein the conveyance control unit controls to drive the first roller not in synchronization with driving of the second roller so as to make the succeeding sheet overlap with the preceding sheet.

24. The printing apparatus according to claim 23, wherein the conveyance control unit controls to drive the second roller to convey the succeeding sheet to a position facing the printing unit in a state in which the succeeding sheet overlaps with the preceding sheet.

25. The printing apparatus according to claim 24, wherein the printing unit includes a printhead configured to eject liquid on the sheet.

26. A method of controlling a printing apparatus including a first roller configured to convey a sheet, a second roller configured to convey the sheet conveyed by the first roller, and a printing unit configured to print on the sheet conveyed by the second roller, the method comprising:
- conveying a succeeding sheet so as to have an interval between a trailing edge of a preceding sheet conveyed before the succeeding sheet and a leading edge of the succeeding sheet; and
- controlling to drive the first roller in synchronization with driving of the second roller in a state where the printing unit prints on the preceding sheet and the preceding sheet is conveyed by the first roller, and to drive the first roller not in synchronization with driving of the second roller so as to make the succeeding sheet catch up with the preceding sheet in a state where the printing unit prints on the preceding sheet after the trailing edge of the preceding sheet passes the first roller.

27. The method according to claim 26, further comprising controlling to drive the first roller not in synchronization with driving of the second roller so as to make the succeeding sheet overlap with the preceding sheet.

28. The method according to claim 27, further comprising controlling the second roller to convey the succeeding sheet to a position facing the printing unit in a state in which the succeeding sheet overlaps with the preceding sheet.

* * * * *